Jan. 23, 1923.  1,442,880
W. F. HELMOND.
SPRING MOTOR FOR TYPEWRITER CARRIAGES.
FILED FEB. 12, 1919.
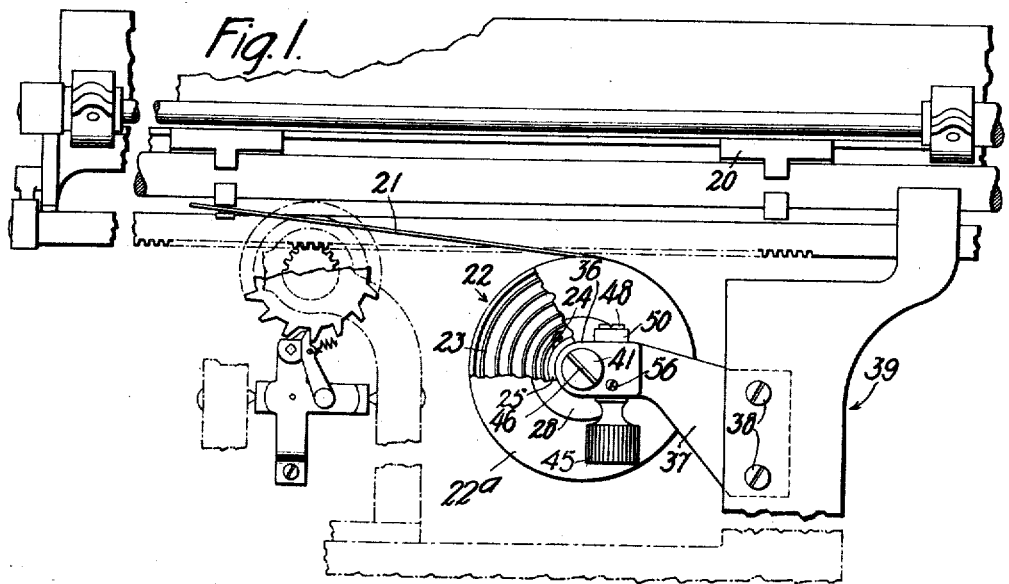
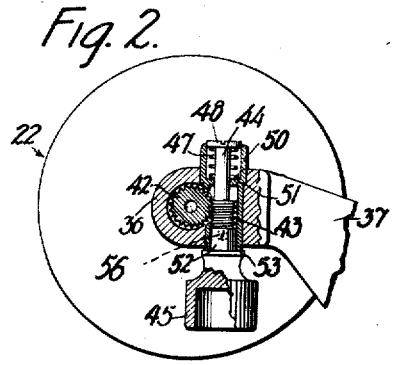
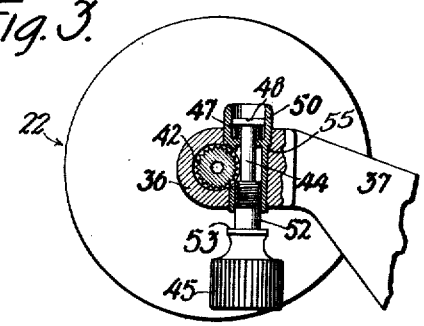
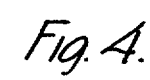
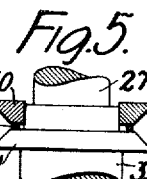
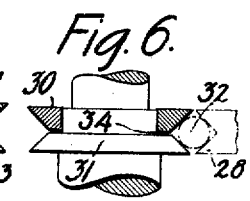
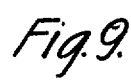
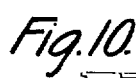
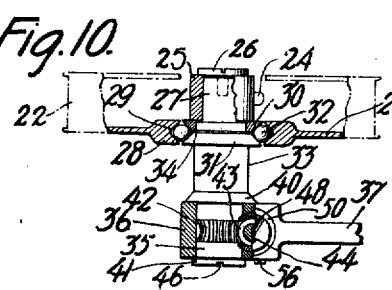
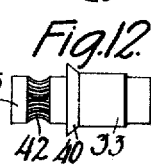
Inventor:
William F. Helmond
by O. C. Stickney
Attorney Patented Jan. 23, 1923.

1,442,880

UNITED STATES PATENT OFFICE.

WILLIAM F. HELMOND, OF HARTFORD, CONNECTICUT, ASSIGNOR TO UNDERWOOD TYPEWRITER COMPANY, OF NEW YORK, N. Y., A CORPORATION OF DELAWARE.

SPRING MOTOR FOR TYPEWRITER CARRIAGES.

Application filed February 12, 1919. Serial No. 276,503.

*To all whom it may concern:*

Be it known that I, WILLIAM F. HELMOND, a citizen of the United States, residing in Hartford, in the county of Hartford and State of Connecticut, have invented certain new and useful Improvements in Spring Motors for Typewriter Carriages, of which the following is a specification.

This invention relates to springs for propelling the carriages of typewriters, and particularly to means for tensioning the spring, and to mounting the spring barrel upon a ball bearing, the whole combined in such a manner as to simplify and expedite assembling and disassembling, as well as attaching and detaching the spring from the machine.

One of the objects of the invention is to improve the means for winding and unwinding the spring. This has been commonly done by means of a pawl and ratchet, which have been bulky and expensive, and which have rendered it a slow and difficult operation to detach the spring barrel from the machine, as well as making it impossible to manufacture the spring barrel, with its appurtenances, as a substantial unit, for ready introduction into the machine and ready detachment therefrom for inspection and repair. I provide an inexpensive spring-adjusting device of compact and neat appearance, not liable to get out of order, easily operated, of few parts, and permitting ready detachment and replacement of the spring barrel in the machine, without employing special tools or requiring special skill.

The spring, which is of snail form, is connected at its outer end to the spring barrel which drives the typewriter carriage, and at its inner end to an arbor, which is revoluble for the purpose of adjusting the tension of the spring. Upon this arbor I form a worm-gear, making an annular depression or groove in the arbor, so that this gear need not interfere with the insertion of the arbor in its bearing in the typewriting machine, nor with the detachment thereof from the machine. With this gear meshes a worm, which is formed upon a stem or shank, the latter having at its lower end a finger-wheel whereby it may be rotated to effect rotation of the spring-arbor, and thereby adjust the tension of the spring.

This worm and worm-gear arrangement is simple, inexpensive and compact; and I have further constructed it in a manner to permit rapid rotation of the spring-arbor when desired, as well as to allow ready mounting or demounting of the arbor from the machine. For these purposes, the worm-shaft is made yieldable endwise. By forcibly rotating the spring-arbor, said worm-shaft may hence be carried down endwise; and the worm is so short that it may by this means be readily driven down to a position where it can no longer control the worm-wheel. Hence the latter may independently be forced around as far as desired, thereby tensioning the spring. This rapid adjustment of the spring-arbor may be effected by any suitable tool, as a screw-driver. The arbor is provided at its outer end with a screw, having a nick in its head, permitting the use of a screw-driver to rotate the arbor for tensioning the spring thereon. Thus it is only necessary to place the screw-driver in the nick and rotate it to the right as far as desired; the first effect being to force the worm-shaft down from an effective to an ineffective position, whereupon the winding of the spring by the screw-driver may be effected by continued turning of the screw-driver. If it is desired to unwind the spring rapidly, this can also be done by a screw-driver, first by turning it to the right to force down the worm and worm-shaft, (which may be held down by grasping the hand-wheel or knob provided upon the lower end thereof, thus keeping the worm out of contact with the worm-wheel) and then allowing the spring to unwind itself under control of the screw-driver. Thereupon the handle of the worm-shaft may be released, and a restoring spring may be employed to lift the worm-shaft into re-engagement with the worm. Said worm thus acts as a locking dog or pawl for the worm-gear, at the same time being capable of effecting fine or slow adjustments of the spring-arbor by rotating said hand-wheel. In using a screw-driver to rotate the arbor to the right, to wind up the carriage spring, it is not necessary to hold the worm out of mesh with the worm-gear, as the teeth of the worm-gear will click past the end of the spring-pressed worm, the worm and worm-gear then acting like a pawl and ratchet.

In detaching the spring barrel and arbor from the machine, said screw may first be taken out, and then the worm-shaft may be pulled down by means of the handle thereon, until the worm is disengaged from the worm-gear. Then the arbor may be drawn forwardly out of its bearing.

In order to secure the necessary delicacy of action of the typewriter carriage, the spring barrel is mounted upon ball bearings; and the present improvements comprise means whereby the spring barrel, spring, ball bearing and arbor, with its worm-gear, may be assembled as a unit, and thus placed in the machine or removed therefrom. Upon said arbor are placed two cones, which cooperate with an interior groove in the spring barrel to form a raceway for a single circular row of balls. In assembling the cones and balls, the cones are forced together until play of the balls is taken up. At the same time there is effected a flattening of a copper or other soft metal C-shaped washer or wire, which is interposed between the cones, so that at the conclusion of the tightening operation this soft washer becomes of the exact thickness required to give the cones the necessary separation. It then serves to support the pressure of the cones towards each other.

There is placed upon the arbor a collar, having a hook to catch the inner end of the carriage spring. A screw is threaded into the forward end of the arbor to press said collar against the cones and hold the same tightly against the intervening soft washer.

The spring barrel, spring, collar, arbor, cones and balls thus may be assembled as a unit, ready to be placed in the machine. It is only necessary to slip the rear end of the arbor (which contains the depressed worm-gear) into a bearing provided upon the machine frame. This is done while the worm is held down, so as to clear the way and permit passage of the arbor through the bearing. Then the worm is released and allowed to snap up into mesh with the worm-gear, where it forms a key to hold the arbor in place. Thereupon the confining screw may be turned home in the outer end of the arbor. Thus it will be seen that the spring barrel is mounted upon ball bearings, and may be taken from the machine without the necessity of disassembling the balls one by one, and without the liability of losing any of the balls, and without the necessity of the use of skill or special tools in separating the spring barrel from its tensioning devices.

Other features and advantages will hereinafter appear.

In the accompanying drawings.

Figure 1 is a rear elevation of a carriage-driving spring and appurtenances embodying the present improvements.

Figure 2 is a sectional rear elevation, illustrating the devices for regulating the tension of the carriage spring, the parts being in normal positions.

Figure 3 is a view similar to Figure 2, but illustrating the carriage-spring arbor as freed from the control of its regulating device, so that the arbor may turn rapidly either to the right or the left under the control of a screw-driver, or so that it may be slipped endwise out of its bearing.

Figure 4 is a perspective view of a collar placed upon the arbor, and having a hook to catch the inner end of the carriage-driving spring.

Figure 5 is a part-sectional view to illustrate a soft metal wire or washer between the bearing cones which support the spring barrel.

Figure 6 is a similar view, but showing the cones forced together until the play of the balls is taken up, the soft wire washer being shown as flattened by the operation of pressing the cones together, so as to form a support of the exact thickness required for separating the cones.

Figure 7 is a screw, and Figure 8 is a worm-shaft, into the upper end of which the screw is tapped, for confining a spring which lifts or restores the worm-shaft to normal engaging or effective position after it has been depressed to clear the worm-gear.

Figure 9 is a longitudinal sectional view of a housing to receive the parts seen at Figures 7 and 8, and to be inserted in the bracket or frame of the typewriter crosswise of the carriage-driving spring arbor, as at Figures 2 and 3.

Figure 10 is a sectional plan to illustrate the carriage spring barrel, its ball bearings, arbor, worm and worm-wheel.

Figure 11 is a side view of a C-shaped soft metal wire or washer inserted between the ball bearing cones, as at Figure 5, and compressed by the closing of said cones together to take up the play of the balls, as at Figure 6.

Figure 12 is a plan of the arbor.

The carriage 20 of a typewriting machine is connected by a strap 21 to a barrel 22, containing a snail spring 23, attached at its outer end to the barrel, and at its inner end catching over a hook 24 provided upon an anchorage in the form of a collar 25. A screw 26, tapped into the end of a reduced portion 27 of an arbor, upon which said collar fits, is used for holding the collar firmly in place, so that adjustment of the tension of the spring may be effected by turning the arbor. A side plate 22ᵃ of the spring barrel is provided with a thickened hub portion 28, having an interior V-groove 29 to co-operate with cones 30, 31, to form a raceway for a single set of bearing balls 32. The screw 26 presses the collar 25 firmly against cone 30 and also presses cone 31 firmly against a shoulder 33 formed at the inner end of the reduced portion 27 of the arbor.

A soft metal C-shaped wire 34, such as copper, may be interposed between the cones, as at Figure 5, so as to constitute a variable spacing medium or compressible separator for said cones, and the latter may be forced towards each other to bring the balls 32 to a fit in the raceway, as at Figure 6; this relative movement of the cones resulting in the reducing of the wire 34 from the round condition at Figure 5 to the flat condition at Figure 6, so that said wire or washer now forms a permanent spacer for the cones, of the exact thickness necessary for eliminating play of the bearing balls. The screw 26 clamps together the collar 25 and the cones, with the intervening washer 34 and the shoulder 33, so that a firm bearing is afforded for the balls, and so that adjustment of the tension of the spring 23 may be secured by rotating the arbor 27, since the anchorage or collar 25 must turn therewith.

The rear end portion 35 of the arbor is rotatably mounted in a boss 36 formed upon a bracket 37, secured by screws 38 to the framework 39 of the typewriter. A shoulder 40 is formed upon the arbor to abut against the boss 36, and prevent endwise displacement of the arbor in one direction. The head of a keeper screw 41, which is threaded into the rear end of the arbor, prevents detachment or endwise displacement of the arbor in the opposite direction. When the screw 41 is unscrewed from the arbor, the latter may be withdrawn from or replaced in the boss 36.

The arbor may be normally held against rotation by means of a worm-gear 42 formed preferably in the bearing portion 35 of the arbor, said gear being sunken or forming an annular depression in the arbor, its teeth and tooth spaces being concave or re-entrant in form so as not to interfere with the detachment or replacement thereof in the boss 36. With this worm-gear co-operates a worm 43, formed upon a vertical stem or shaft 44, having at its lower end a fingerwheel 45 for turning the same, and thereby slowly rotating the arbor 27 with the collar 25, hook 24 and inner end of the carriage spring 23, to adjust the tension thereof in either direction.

The worm 43 on the shaft 44 is capable of withdrawal from mesh with the worm-gear 42, so as to permit rapid rotation of the arbor 35, independently of said worm.

By placing a screw-driver in the nick 46 of the screw 41, the arbor may be turned to the right, and the worm-gear 42 thereon may thereby be caused to force downwardly the worm 43 from its normal engaged or effective position at Figure 2 to the disengaged or ineffective position at Figure 3. Thereupon the continued turning of the screw-driver will cause the arbor to rotate, so that the spring may be wound expeditiously to the desired tension. If the screw-driver is allowed to yield towards the left, a restoring spring 47 will lift the worm 43 and shaft 44 from the ineffective position at Figure 3 into effective engagement with the worm-gear, which eventually reaches the normal arbor-locking position at Figure 2. In turning the arbor to the right, the spring 47 yields, so that the slidable worm 43 acts as a spring-pressed pawl to permit free rotation of the arbor to the right or clockwise, while checking its rotation in the opposite direction. Said spring 47 bears up against the head of a screw 48 threaded into a hole 49 formed in the top of the worm-shaft 44. The shaft is surrounded by said spring, and both the shaft and spring are enclosed in a bearing member or housing 50 forming a removable mounting of tubular form, and divided between its ends by a partition 51, which as bored to form a bearing for shaft 44, which is both rotative and sliding in its mounting 50; the lower end 52 of the shaft being of a diameter to fit in the housing. The spring 47 normally holds a shoulder 53 on the worm-shaft up against the lower end of the housing, which forms a stop as at Figure 2. The restoring spring 47, confined by the head of the screw 48 abuts against the partition 51, which forms a stop for limiting the downward movement of the worm-shaft 44, as in Figure 3. It is therefore seen that these stops (formed by the lower end of the housing 50 and by the partition 51 therein) constitute means for limiting the movement of the worm for play or lost motion between its two positions. Said housing has a lateral perforation or opening, as at 54, which may fit the arbor, so that said arbor locks the housing against detachment from the bracket 37. Said bracket is formed at its upper end with a seat into or against which the upper enlarged end of the housing is depressed when the parts are assembled. When the arbor is withdrawn, the housing may be lifted out from the bracket; the screw 48 being first detached, and the worm-shaft 44 being pulled down out of the housing. The worm-shaft may be locked against rotation by means of a set screw 56, threaded into the bracket and passing through an opening 57 in the housing, and bearing against the lower portion 52 of the worm-shaft. The housing 50 is provided with an apertured partition 55, and such partition, spring 47, and screw 48 constitute means for retaining the worm-shaft 44 in the housing.

In operation, the screw 56 may be released and the hand-wheel 45 may be rotated while in the normal Figure 2 position, to effect slow rotative adjustment of the arbor 27, and thereby increase or diminish the tension of the carriage spring 23; or a screw-driver may be inserted in the screw 41 and the same turned as far as desired to the right independently of the worm 43, since the gear 42 will force said worm down out of the way, as at Figure 3, against the tension of the restoring spring 47, the teeth of the worm-gear 42 then slipping past the end of the spring-pressed slidable worm 43, which acts as a pawl to permit rotation of the arbor in one direction while checking or preventing its rotation in the opposite direction. The hand-wheel 45 may be grasped and held down during the spring-winding operation, and also during the unwinding of the spring under the restraint of the screw-driver, if desired.

Upon removing the screw 41, the arbor may be pulled forwardly out of the boss 36; the hand-wheel 45 having first been grasped to pull down the worm to the Figure 3 position of disengagement with the gear, so as to permit the endwise withdrawal of the arbor, as normally the worm constitutes a key to prevent removal of the arbor. Thus, the spring barrel may be conveniently and expeditiously removed from the machine or replaced therein without the use of special tools, or the requirement of special skill or experience. The worm-shaft may be readily removed after first having taken out the screw 48; and the housing 50 may be also readily lifted out of its socket in the bracket 37, after the removal of the arbor. Thus, it will be seen that the spring barrel, spring, ball bearings, arbor and adjusting gear, may be manufactured as a unit and so placed in the machine or removed therefrom, and that other spring barrels of different diameters may be substituted when required, by simply taking out one unit and substituting another therefor in the machine.

Variations may be resorted to within the scope of the invention, and portions of the improvements may be used without others.

Having thus described my invention, I claim:

1. In combination, a typewriter-carriage-propelling spring, a barrel therefor, an arbor for said barrel, said arbor being connected to said spring for tensioning the same, a worm-gear upon said arbor, and a worm normally in an effective position meshing with said gear to rotate the arbor, said worm being provided with means for turning the same and being permanently mounted for a bodily movement from its effective position in mesh with said gear to an ineffective position free therefrom to provide for the independent rotation of said arbor.

2. In combination, a typewriter-propelling spring, a barrel therefor, an arbor for said barrel, said arbor being connected to said spring for tensioning the same, a worm-gear upon said arbor, and a worm normally in effective position meshing with said gear to rotate the arbor, said worm being provided with means for turning the same and being permanently mounted for movement from its effective position in mesh with said gear to an ineffective position free therefrom to provide for the independent rotation of said arbor, said arbor having separate means whereby it may be rotated under control for adjusting the tension of the spring when said worm is moved to its position free from said gear.

3. In combination, a typewriter-carriage-propelling spring, a barrel therefor, an arbor for said barrel, said arbor being connected to said spring for tensioning the same, and means for rotating said arbor, said means comprising a worm-gear upon said arbor and a worm provided with a finger-piece, and means for permanently mounting the worm for movement between a position in which it meshes with said gear and another position in which the gear is freed from the control thereof to provide for independent rotation of the arbor, said worm-gear being depressible below the circumference of the arbor to permit insertion or withdrawal of the arbor from its bearing when the worm is moved to its position free from the worm-gear.

4. In combination, a typewriter carriage propelling spring, a barrel therefor, an arbor for said barrel, said arbor connected to said spring for tensioning the same, a worm gear upon said arbor, a worm provided with a finger-piece and meshing with said gear and movable to free the gear from the control thereof, and a spring tending to restore said worm to normal effective position.

5. In combination, a typewriter-carriage-propelling spring, a barrel therefor, an arbor for said barrel, said arbor being connected to said spring for tensioning the same, a bearing for said arbor, a worm-gear upon said arbor, a worm normally in an effective position meshing with said gear to rotate the arbor, bearings for the worm, and means for retaining the worm in its bearings, said worm being provided with means for rotating the same and said retaining means being constructed to enable the worm to undergo a bodily movement of translation between two positions, in one of which it constitutes means for retaining said arbor in place in said bearing and in the other of which it permits independent rotation or withdrawal of said arbor.

6. In combination, a typewriter-carriage-propelling spring, a barrel therefor, an arbor for said barrel, said arbor being connected to said spring for tensioning the same, a worm gear upon said arbor, a worm normally in effective position meshing with said gear to rotate the arbor, said worm being provided with means for rotating the same, a mounting for said worm in which said worm is bodily movable from its effective position in mesh with said gear to an ineffective position free therefrom to provide for the independent rotation of said arbor, a bearing for said arbor, a shoulder on said arbor to abut against said bearing, and a fastening device co-operating with said shoulder to confine said arbor in said bearing, said fastening device also affording a hold to enable the rotation of the arbor to be controlled when said worm is moved to its position free from said gear.

7. In combination, a type writer carriage propelling spring, a barrel therefor, an arbor for said barrel, said arbor connected to said spring for tensioning the same, a worm gear upon said arbor, a worm provided with a finger-piece and meshing with said gear and movable to free the gear from the control thereof, said arbor having separate means whereby it may be rotated under control for adjusting the tension of the spring, and a spring tending to restore said worm to normal effective position.

8. In combination, a typewriter carriage propelling spring, a barrel therefor, an arbor for said barrel, said arbor connected to said spring for tensioning the same, a worm gear upon said arbor, and a worm provided with a finger-piece and meshing with said gear and movable to free the gear from the control thereof, said arbor mounted in a bearing and having a part to confine it in said bearing, said part constructed to be operable only by a tool, to control the rapid rotation of the arbor.

9. In combination, a typewriter-carriage-propelling spring, a barrel therefor, an arbor for said barrel, said arbor being connected to said spring for tensioning the same, a worm-gear upon said arbor, a worm normally in effective position meshing with said gear to rotate the arbor, said worm being provided with means for turning the same, and a mounting for said worm in which said worm is bodily movable from its effective position in mesh with said gear to an ineffective position free therefrom to provide for the independent rotation of said arbor, said arbor having separate means whereby it may be rotated under control for adjusting the tension of the spring when said worm is moved to its position free from said gear, and whereby said worm will be automatically moved by said gear to its position free from said gear to permit such adjustment.

10. The combination of a typewriter-carriage-driving spring, a barrel therefor, an arbor, said barrel being mounted upon said arbor by means of ball bearings, a bracket or fixture having a bearing in which said arbor is rotatably mounted, said arbor, ball bearings, spring and barrel being attachable or detachable as a unit in their assembled relation, and said arbor having an adjusting device comprising a gear sunken in the arbor, to permit its withdrawal from said bearing, and a worm mounted in said bracket or fixture normally in position to engage said gear to rotate said arbor and being permanently mounted for movement to disengaging position in said bracket or fixture to permit independent rotation or withdrawal of said arbor.

11. The combination of a typewriter-carriage-driving spring, a barrel therefor, an arbor, said barrel being mounted upon said arbor by means of ball bearings, a bracket having a bearing in which said arbor is rotatably mounted, said arbor, ball bearings, spring and barrel being attachable or detachable as a unit in their assembled relation, and said arbor having an adjusting device comprising a gear sunken in the arbor, to permit its withdrawal from said bearing, a worm mounted in said bracket normally in position to engage said gear to rotate said arbor, said worm being bodily movable to disengaging position in said bracket to permit independent rotation or withdrawal of said arbor, and means for limiting the movement of said worm between its two said positions.

12. In combination, a typewriter carriage driving spring, a barrel therefor, an arbor, a pair of cones upon said arbor, said spring barrel having an interior groove, balls inserted between said cones and said groove, a compressible separator between said cones, a collar upon said arbor, said arbor having a shoulder, and a screw threaded into the end thereof, said cones, separator and collar being confined between said shoulder and the head of said screw, the combined axial dimensions of said collar, cones and separator being greater than the distance between said shoulder and the end of said arbor, so that said screw may firmly clamp them in fixed relation therewith.

13. The combination of a typewriter carriage driving spring, a barrel therefor, an arbor, a pair of cones upon said arbor, said spring barrel having an interior groove, balls inserted between said cones and said groove, a collar upon said arbor, said arbor having a shoulder, and a screw threaded into the end of said arbor to press said collar and said cones against said shoulder, a soft metal washer being inserted between said cones and flattened to a point where the cones are sufficiently close together to take up the play of the balls.

14. In combination, a carriage driving spring, a spring barrel, an arbor, a collar upon said arbor having means to catch the end of the spring, cones upon said arbor, said barrel having a groove to co-operate with said cones, balls inserted between said cones and said groove, a spacing medium between said cones a limiting stop on said arbor, and a screw to hold said collar, cones and spacing medium clamped in position between said screw and said stop, said elements forming a unit for detachment from or attachment to a machine in their assembled relation.

15. A carriage-driving spring, a spring barrel, an arbor formed with a forwardly-facing shoulder, a bearing for the arbor disposed rearwardly of said shoulder, a removable collar upon said arbor having means to catch the end of the spring, removable cones mounted upon said arbor between the collar and said shoulder and separately from said collar, said barrel having a groove to co-operate with said cones, balls inserted between said cones and said groove, a screw to hold said collar and cones in position against said shoulder and thereby to retain said barrel on the arbor by means of said balls, and a sunken gear provided in said arbor to permit the insertion and withdrawal of the arbor, said gear forming a part of an arbor-rotating device, said elements forming a unit for detachment from or attachment to a machine in their assembled relation.

16. A carriage-driving spring, a spring barrel, an arbor formed with a forwardly-facing shoulder, a bearing for said arbor disposed rearwardly of said shoulder, a collar upon said arbor having means to catch the end of the spring, cones mounted directly upon said arbor, between the collar and said shoulder, said barrel having a groove to co-operate with said cones, balls inserted between said cones and said groove and serving to retain said barrel on the arbor, a screw to hold said collar and cones in position, a gear upon said arbor, said elements forming a unit for detachment from or attachment to a machine in their assembled relation, and a worm normally in an effective position to engage said gear to rotate said arbor, said worm being bodily movable to an ineffective position to release the gear.

17. A carriage-driving spring, a spring barrel, an arbor, a collar upon said arbor having means to catch the end of the spring, cones upon said arbor, said barrel having a groove to co-operate with said cones, balls inserted between said cones and said groove, a screw to hold said collar and cones in position, a gear upon said arbor, said elements forming a unit for detachment from or attachment to a machine, a worm to engage said gear, said worm movable to release the gear, a shaft upon which said worm is formed, a spring for holding said shaft in effective position, and a handle upon said shaft.

18. A carriage-driving spring, a spring barrel, an arbor, a collar upon said arbor having means to catch the end of the spring, cones upon said arbor, said barrel having a groove to co-operate with said cones, balls inserted between said cones and said groove, a screw to hold said collar and cones in position, a gear upon said arbor, said elements forming a unit for detachment from or attachment to a machine, a worm to engage said gear, said worm movable to release the gear, a shaft upon which said worm is formed, a spring for holding said shaft in effective position, a handle upon said shaft, and a housing in which said shaft is mounted to rotate and move endwise.

19. A bracket, a carriage-driving spring, a spring barrel, an arbor, means upon said arbor to catch the end of the spring, a gear provided upon said arbor to permit the insertion and withdrawal of the arbor, said elements forming a unit for detachment from or attachment to said bracket, a worm to engage said gear, said worm movable to release the gear, a shaft upon which said worm is formed, a spring for holding said shaft in effective position, and a housing in which said shaft may rotate and move endwise, said bracket having a seat for said housing.

20. A bracket, a carriage-driving spring, a spring barrel, an arbor, means upon said arbor to catch the end of the spring, a gear provided upon said arbor to permit the insertion and withdrawal of the arbor, said elements forming a unit for detachment from or attachment to said bracket, a worm to engage said gear, said worm movable to release the gear, a shaft upon which said worm is formed, a spring for holding said shaft in effective position, and a housing in which said shaft may rotate and move endwise, said bracket having a seat for said housing, and said housing having an opening to engage the periphery of said arbor to be locked thereby in the bracket.

21. A bracket, a carriage-driving spring, a spring barrel, an arbor, means upon said arbor to catch the end of the spring, a gear provided upon said arbor to permit the insertion and withdrawal of the arbor, said elements forming a unit for detachment from or attachment to said bracket, a worm to engage said gear, said worm movable to release the gear, a shaft upon which said worm is formed, a spring for holding said shaft in effective position, a housing in which said shaft may rotate and move endwise, said bracket having a seat for said housing, and said housing having an opening to engage the periphery of said arbor to be locked thereby in the bracket, and a set screw passing through an opening in said housing to engage said shaft to lock the same.

22. The combination of a typewriter-carriage-driving spring, a barrel therefor, an arbor, a bracket having a bearing in which said arbor is rotatably mounted, said arbor having an adjusting device comprising a gear in position to permit the withdrawal of the arbor from said bearing, an endwise shiftable worm mounted in said bracket normally in position to engage said gear to rotate said arbor, bearings for the worm, and means for retaining the worm in its bearings, said retaining means being constructed to permit the worm to shift endwise while confined by said retaining means, thereby to free itself from the gear and permit independent rotation or withdrawal of said arbor.

23. The combination of a typewriter carriage driving spring, a barrel therefor, an arbor, a bracket or fixture having a bearing on which said arbor is rotatably mounted, said arbor, spring and barrel being attachable or detachable as a unit, and said arbor having an adjusting device comprising a gear included in said unit and in position to permit the withdrawal of the arbor from said bearing, and a worm mounted in said bracket or fixture to engage said gear and movable to disengaging position, said arbor being detachably confined in said bracket by means of a screw which is also capable of controlling the adjustment of the arbor and spring.

24. A spring-motor for a typewriter-carriage, comprising, in combination, a motor-spring, an arbor rotatable to adjust the motor-spring, a support comprising a bearing for said arbor, the portion of said arbor mounted in said bearing having re-entrant teeth forming a worm-gear, a worm normally meshing with the worm-gear and capable of preventing endwise removal of said arbor from said bearing, and retaining means for the worm, said worm being mounted for rotation, and said retaining means being constructed to enable the worm to be moved endwise to a different position free from said gear, so as to permit independent rotation or withdrawal thereof.

25. A spring motor for a typewriter carriage comprising, in combination, an arbor rotatable to adjust the motor-spring, a support comprising a bearing for said arbor, the portion of said arbor mounted in said bearing having concave teeth forming a worm gear such as will permit endwise removal of said arbor from said bearing, a worm, and a bearing for said worm removable endwise from said support, said arbor when in place in its bearing constituting a key to hold said worm-bearing in place, said worm being mounted for both rotation and endwise movement in its bearing, said worm being normally in mesh with said worm gear and constituting a key to prevent removal of said arbor from said bearing, said worm being movable endwise in its bearing to a different position free from said gear, so as to permit independent rotation thereof or withdrawal of said arbor from its bearing, and said worm and its bearing being removable from said support on removal of said arbor.

26. In combination, a typewriter carriage driving spring, a barrel therefor, an arbor, a removable ball-bearing by which said barrel is journaled on said arbor, a removable collar on said arbor, said spring being connected at one end to said barrel and at the other to said collar, a shoulder on said arbor, and a fastening device at its end for securing said ball-bearing and said collar on the arbor and clamping them against said shoulder, all of said parts being attachable to and detachable from a typewriter frame as an assembled unit.

27. In combination, a typewriter-carriage-propelling spring, a barrel therefor, an arbor for said barrel, said arbor being connected to said spring for tensioning the same, a worm-gear upon said arbor, and a worm provided with a finger-piece and normally meshing with said gear and movable to free the gear from the control thereof automatically by independent rotation of the gear in one direction.

28. In combination, a typewriter-carriage-propelling spring, a barrel therefor, an arbor for said barrel, said arbor being connected to said spring for tensioning the same, a worm-gear upon said arbor, a worm normally in an effective position meshing with said gear to rotate the arbor, said worm being provided with means for turning the same, and a mounting for said worm in which said worm is bodily movable endwise in one direction into engagement with said worm-gear to rotate the arbor in either direction and for locking the latter against rotation in one direction, said worm being bodily movable endwise in the opposite direction by independent rotation of said worm-gear in the other direction so as to provide for rotating the latter independently of the worm.

29. In combination, a typewriter-carriage-propelling spring, a barrel therefor, an arbor for said barrel, said arbor being connected to said spring for tensioning the same, a worm-gear upon said arbor, a worm normally in an effective position meshing with said gear to rotate the arbor, said worm being provided with means for turning the same, a mounting for said worm in which said worm is bodily movable endwise in one direction into an effective position in engagement with said worm-gear to rotate the arbor in either direction and for locking the latter against rotation in one direction and which is bodily movable endwise in the opposite direction to an ineffective position out of engagement with said worm-gear by independent rotation of the worm-gear in the other direction thereby to provide for independent rotation of the latter, and means for limiting the endwise movement of said worm for play between its two said positions.

30. In combination, a typewriter-carriage-propelling spring, a barrel therefor, an arbor for said barrel, said arbor being connected to said spring for tensioning the same, a worm-gear upon said arbor, a worm normally in effective position meshing with said gear to rotate the arbor, said worm being provided with means for turning the same, a mounting for said worm in which said worm is bodily movable from its effective position in mesh with said gear to an ineffective position free therefrom to provide for the independent rotation of said arbor, said arbor having separate means whereby it may be rotated under control for adjusting the tension of the spring when said worm is moved to its position free from said gear, and means for limiting the movement of said worm for play between its two said positions.

31. In combination, a typewriter-carriage-propelling spring, a barrel therefor, an arbor for said barrel, said arbor being connected to said spring for tensioning the same, a worm-gear upon said arbor, a worm normally in effective position meshing with said gear to rotate the arbor, said worm being provided with means for turning the same, a mounting for said worm in which said worm is bodily movable from its effective position in mesh with said gear to an ineffective position free therefrom to provide for the independent rotation of said arbor, said arbor having separate means whereby it may be rotated under control for adjusting the tension of the spring when said worm is moved to its position free from said gear, and whereby said worm will be automatically moved by said gear to its position free from said gear to permit such adjustment, and means for limiting the movement of said worm for play between its two said positions.

32. In combination, a typewriter-carriage-propelling spring, a barrel therefor, an arbor for said barrel, said arbor being connected to said spring for tensioning the same, a worm-gear upon said arbor, a worm normally in effective position meshing with said gear to rotate the arbor, said worm being provided with means for rotating the same, a mounting for said worm in which said worm is bodily movable from its effective position in mesh with said gear to an ineffective position free therefrom to provide for the independent rotation of said arbor, a bearing for said arbor, a shoulder on said arbor to abut against said bearing, a fastening device co-operating with said shoulder to confine said arbor in said bearing, said fastening device also affording a hold to enable the rotation of the arbor to be controlled when said worm is moved to its position free from said gear, and means for limiting the movement of said worm for play between its two said positions.

33. A carriage-driving spring, a spring barrel, an arbor, a collar upon said arbor having means to catch the end of the spring, cones upon said arbor, said barrel having a groove to co-operate with said cones, bearing balls inserted between said cones and said groove and serving to retain said barrel on the arbor, a screw to hold said collar and cones in position, a gear upon said arbor, said elements forming a unit for detachment from or attachment to a machine in their assembled relation, a worm normally in an effective position to engage said gear to rotate said arbor, said worm being bodily movable to an ineffective position to release the gear, and means for limiting the movement of said worm for play between its two said positions.

34. The combination of a typewriter-carriage-driving spring, a barrel therefor, an arbor, a bracket or fixture having a bearing on which said arbor is rotatably mounted, said arbor, spring and barrel being attachable or detachable as a unit in their assembled relation, and said arbor having an adjusting device comprising a gear included in said unit and in position to permit the withdrawal of the arbor from said bearing, a worm mounted in said bracket or fixture normally in position to engage said gear to rotate said arbor and being bodily movable to disengaging position to permit independent rotation or withdrawal of said arbor, and means for limiting the movement of said worm for play between its two said positions.

35. A spring-motor for a typewriter carriage comprising, in combination, a motor-spring, an arbor rotatable to adjust the motor-spring, a support comprising a bearing for said arbor, the portion of said arbor mounted in said bearing having re-entrant teeth forming a worm-gear such as will permit endwise removal of said arbor from said bearing, a worm mounted for both rotation and endwise movement between two positions in said support, said worm, when in normal position, being in mesh with said gear and constituting a key to prevent removal of said arbor from said bearing, said worm being movable endwise to a different position free from said gear, so as to permit independent rotation or withdrawal thereof, and means for limiting the movement of said worm for play between its two said positions.

36. A carriage-driving spring, a spring barrel, an arbor, a collar upon said arbor having means to catch the end of the spring, cones upon said arbor, said barrel having a groove to co-operate with said cones, bearing balls inserted between said cones and said groove and serving to retain said barrel on the arbor, a screw to hold said collar and cones in position, a gear upon said arbor, said elements forming a unit for detachment from or attachment to a machine in their assembled relation, and a worm normally in an effective position to engage said gear to rotate said arbor, said worm being bodily movable to an ineffective position to release the gear automatically by independent rotation of said gear in one direction.

37. The combination of a typewriter-carriage-driving spring, a barrel therefor, an arbor, a bracket or fixture having a bearing on which said arbor is rotatably mounted, said arbor, spring and barrel being attachable or detachable as a unit in their assembled relation, and said arbor having an adjusting device comprising a gear included in said unit and in position to permit the withdrawal of the arbor from said bearing, and a worm mounted in said bracket or fixture normally in position to engage said gear to rotate said arbor and being bodily movable to disengaging position to permit independent rotation or withdrawal of said arbor automatically by independent rotation of said gear in one direction.

38. In combination, a typewriter-carriage-propelling spring, a barrel therefor, an arbor for said barrel, said arbor being connected to the spring for tensioning the same, and means for rotating the arbor to adjust the tension of the spring, said arbor being constructed for rotation independently of said rotating means, and said rotating means being mounted for movement by the arbor out of operative engagement therewith upon independent rotation of the arbor.

39. In combination, a typewriter-carriage-propelling spring, a barrel therefor, an arbor for said barrel, said arbor being connected to the spring for tensioning the same, and means for rotating the arbor to effect relatively minute adjustments in the tension of the spring, said arbor being specially fitted or shaped for engagement by an appropriate tool for relatively rapid rotation thereof independently of said rotating means, and said rotating means being mounted for movement by the arbor out of operative engagement therewith to enable the arbor to be rotated at relatively rapid speed without interference by said rotating means.

40. In combination, a typewriter-carriage-propelling spring, a barrel therefor, an arbor for said barrel, said arbor being connected to the spring for tensioning the same and being constructed to enable it to be rotated at a relatively rapid speed and thus enable the tension of the spring to be quickly varied within a wide range, and means connected with the arbor for rotating it to effect relatively minute adjustments in the tension of the spring.

41. In combination, a typewriter-carriage-propelling spring, a barrel therefor, an arbor for said barrel, said arbor being connected to the spring for tensioning the same and being constructed to enable it to be rotated at a relatively rapid speed, and means for rotating the arbor to effect relatively minute adjustments in the tension of the spring, said rotating means being movable from operative to inoperative position by rotation of the arbor.

42. In combination, a typewriter-carriage-propelling spring, a barrel therefor, an arbor for said barrel, said arbor being connected to the spring for tensioning the same and being constructed to enable it to be rotated at a relatively rapid speed, and means for rotating the arbor to effect relatively minute adjustments in the tension of the spring, said rotating means being mounted for movement by rotation of the arbor in a direction to increase the tension of the spring to a position in which it permits rotation of the arbor independently of said means either in a direction to increase the tension of the spring or in a direction to decrease the tension of the spring.

43. In combination, a typewriter-carriage-propelling spring, a barrel therefor, an arbor for said barrel, said arbor being connected to said spring for tensioning the same, a worm-gear upon said arbor, a worm meshing with said gear, a shaft carrying said worm, bearings for said shaft in which the shaft is longitudinally movable by rotation of the arbor to carry the worm out of meshing engagement with said gear, said arbor being rotatable independently of said worm, and means for normally retaining the shaft in position for meshing engagement of said worm and worm-gear.

44. In combination, a typewriter-carriage-propelling spring, a barrel therefor, an arbor for said barrel, a bearing for said arbor, a gear on said arbor, and a worm meshing with the gear, said worm being mounted for movement to ineffective position by rotation of the arbor in one direction.

45. In combination, a typewriter-carriage-propelling spring, a barrel therefor, an arbor for said barrel, said arbor being connected to said spring for tensioning the same, a gear on said arbor, and a worm co-operative therewith for rotating the arbor to effect relatively minute adjustments of the tension of the spring, said worm being shiftable by the gear at any rotative position of the latter to a releasing position, to permit rapid rotation of the arbor.

46. In combination, a typewriter-carriage-propelling spring, a barrel therefor, an arbor for said barrel, said arbor being connected to said spring for tensioning the same, and means for rotating the arbor, said rotating means comprising a worm-gear on the arbor and a worm, said arbor being rotatable in one direction indepndently of said worm, and means connected to the worm for shifting it to a releasing position, to permit independent rotation of the arbor in either direction.

WILLIAM F. HELMOND.

Witnesses:
J. J. BASKERVILLE,
GEORGE H. VARNEY.